United States Patent [19]

Hett et al.

[11] 4,069,013

[45] Jan. 17, 1978

[54] ANTI-DUSTING FORMULATIONS

[75] Inventors: Helmut Hett, Offenbach (Main); Kurt Walser, Bergen-Enkheim, both of Germany

[73] Assignee: Cassella Farbwerke Mainkur Aktiengesellschaft, Germany

[21] Appl. No.: 688,579

[22] Filed: May 21, 1976

[30] Foreign Application Priority Data

May 24, 1975 Germany .............................. 2523096

[51] Int. Cl.² ......................... C09B 67/00; D06P 1/64
[52] U.S. Cl. ................................................. 8/79; 8/34; 8/39 R; 8/41 R; 8/88; 8/92; 8/93; 8/94 R
[58] Field of Search .............. 8/39 R, 41 R, 79, 94 R, 8/, 88, 92, 93

[56] References Cited

U.S. PATENT DOCUMENTS

| | | | |
|---|---|---|---|
| 3,856,699 | 12/1974 | Miyand et al. | 252/316 |
| 3,948,599 | 4/1976 | Irmiger et al. | 8/79 |
| 3,960,486 | 6/1976 | Daubach et al. | 8/79 |
| 3,971,852 | 7/1976 | Brenner et al. | 426/103 |

FOREIGN PATENT DOCUMENTS

| | | |
|---|---|---|
| 776,444 | 6/1972 | Belgium. |
| 1,338,317 | 9/1963 | France. |
| 713,541 | 8/1956 | United Kingdom. |

Primary Examiner—Joseph L. Schofer
Assistant Examiner—A. L. Clingman
Attorney, Agent, or Firm—Connolly and Hutz

[57] ABSTRACT

Pulverulent dyestuffs of all kinds are made highly resistant to dusting by dispersing into the powder a small amount of mineral oil that boils within the range of 140° to 310° C, and an emulsifier having a polyethoxy hydrophile. These additives can be premixed.

10 Claims, No Drawings

ANTI-DUSTING FORMULATIONS

The present invention relates to dust-free or low-dusting pulverulent dyestuff formulations, and to the production and use of these formulations.

Pulverulent dyestuffs and dyestuff formulations are in common use in industry. They are very widely employed for the manufacture of dye liquors for dyeing textile materials, and for the manufacture of printing pastes, for example for textile or paper printing. However, they tend to dust during their preparation and handling. This dust formation can lead to the pollution of work-places, and to significant loss of dyestuff, and is a great nuisance if not a health hazard to the personnel concerned with the processing of the dyestuff powders. The dust problem arises not only during the processing of the dyestuff powders, however, but also already during their manufacture, their standardising and their compounding.

It is thus an important industrial problem to develop pulverulent dyestuffs and dyestuff formulations which are dust-free or low-dusting. The solution of this problem is difficult because pulverulent dyestuff formulations must exhibit a number of quality criteria which are absolutely essential for their industrial use. Examples of these are that the powders do not tend to form lumps, that they are readily free-flowing, do not smear and that they are suitable, without difficulties, for the manufacture of dye liquors and printing pastes. In the manufacture of aqueous dye liquors no sort of oily or greasy deposits, which would lead to soiling of the textile material to be dyed, are allowed to appear. Also, no lumps are allowed to form because these would first have to be sieved or filtered off from the dye liquor in order to avoid off-shade dyeings, and the powders must be easily wettable with water. A further very important condition is that dust-free or low-dusting pulverulent dyestuff formulations may exhibit the valuable property of being dust-free or low-dusting not only shortly after preparation, but this property must be long-lived, that is to say, it should persist over a prolonged period of time for example over a period of at least 12 months. If the life of the dust-free or low-dusting property is not guaranteed, the processor, who in many cases keeps a fairly large stock of dyestuffs and thus under certain circumstances only further processes the dyestuff a relatively long time after buying it, can be greatly troubled by dusting.

Many attempts have already been made to manufacture dust-free or low-dusting pulverulent dyestuff formulations which permit trouble-free processing. Thus, it is already known to reduce dusting by adding small amounts of monoalcohols or polyalcohols and ketones, esters with more than 6 carbon atoms, in particular esters of aromatic carboxylic acids, ethers (ethylene oxide adducts), silicones, dodecylbenzene, octadecene or trioctylamine (see German Pat. Nos. 565,895 and 834,237, British Pat. Spec. Nos. 695,372 and 713,541, U.S. Pat. No. 2,604,469 and German Auslegeschrift Pat. No. 1,117,582). The known measures, however, do not suitably fulfil all the requirements of pulverulent substances with respect to their trouble-free processing and with respect to the permanence of the dust-free or low-dusting property.

According to the present invention very desirable dust-free or low-dusting pulverulent dyestuff formulations contain as dust-resisting agents a mixture of a mineral oil boiling in the range of about 140° to about 310° C, and emulsifier having a polyethoxy hydrophile in an amount sufficient to disperse the oil. Preferably, the sum of the added amounts of said components is 0.05 to 3% by weight of the dyestuff formulation, and the weight ratio of emulsifier to oil is between 25:75 and 5:95. Such dust-free or low-dusting pulverulent dyestuff formulations give, in the Cassella dust-measuring apparatus (see Textilveredlung 9 (1974 No. 3), pages 97–106), a dust value of less than 15.

The measuring method of the CASSELLA dust-measuring apparatus consists in releasing a sample of the powder to be measured from a certain height, so that it falls by gravity, into a measuring chamber, in which dust formation of the substance takes place. The measuring chamber is traversed by a beam of light, the intensity of which is measured by means of a photoelectric cell. The decrease in intensity of the light beam on the measuring cell is a measure of the dust formation of the powder sample released. Heavily dusting substances give dust values of about 100–150. Low-dusting powders give dust values of about 10 to 15 and powders with dust values of less than 10 are virtually dust-free. Powders of efficiently permanent dust-free or low-dusting character are those which have a dust value of not more than 15, even after being stored for at least 12 months after manufacture.

The dust-free or low-dusting pulverulent dyestuff formulations according to the invention can consist only of dyestuff and the foregoing two components. In addition, however, they can contain further auxiliaries that help with the manufacture of pulverulent dyestuff formulations. Dyestuffs in the pure state are only seldom processed in industry. The same is true for mixtures of pure dyestuffs. As a rule, dyestuffs are standardised according to type by means of standardising agents and, if appropriate, are adapted to their intended use by means of wetting agents, antioxidants, preservatives and, independent of the emulsifier used according to the present invention, dispersing agents for the stabilisation of the dyestuff dispersions (see A. M. Schwartz. J. W. Perry, J. Berch, Surface Active Agents and Detergents, Vol. II, 1958, pages 25 to 171, Interscience Publishers, Inc., New York) as well as other known auxiliaries. All of these known auxiliaries can likewise be contained in the pulverulent dyestuff formulations according to the present invention.

The dyestuffs which are contained in the dyestuff formulations according to the present invention can be water-soluble or water-insoluble. They can belong to the series of azo dyestuffs, anthraquinone dyestuffs, methine dyestuffs, quinophthalone dyestuffs or indigo or thioindigo dyestuffs, or can have a structure based on more highly condensed systems, such as, for example, anthanthrone, or on condensed heterocyclic systems, such as, for example, dibenzothiazinone or dibenzoxazinone.

Examples of dyestuffs of this type are direct dyestuffs such as the polyazo dyestuffs C.I. Direct Black 22 or disazo dyestuffs C.I. Direct Blue 213 and 214 and Direct Brown 59, C.I. No. 22,345, reactive dyestuff such as the monoazo dyestuffs C.I. Reactive Red 22 and 71 and C.I. Reactive Orange 31, the metal complex azo dyestuff C.I. Reactive Red 23, the anthraquinone dyestuff C.I. Reactive Blue 53 or the copper phthalocyanine dyestuff C.I. Reactive Blue 53, sulphur dyestuffs in the water-insoluble or water-soluble form, such as C.I. Sulphur Black 11, C.I. Leuco Sulphur Black 11 or C.I. Sulphur Black 6, vat dyestuffs such as the anthraquinone dyestuffs C.I. Vat Yellow 33 and C.I. Vat Green 31, the anthraquinone derivative Vat Orange 3, C.I. No. 59,300, the thioindigo Vat Red 6, C.I. No. 73,335, and basic dyestuffs such as the methine dyestuffs Basic Violet 16, C.I. No. 48,013 or Basic Red 13, C.I. No. 48,015, disperse dyestuffs such as the azo dyestuffs C.I. Disperse Red 184, Violet 48, Orange 71, Yellow 103 and 114 and Blue 165, or the anthraquinone dyestuffs C.I. Disperse Red 60 and Violet 47, or organic pigments based on copper phthalocyanine, quinacridone or polynuclear condensed heterocyclic systems, such as Pigment Violet 23, C.I. No. 31,319.

The emulsifier of the dust-free or low-dusting pulverulent dyestuff formulations according to the present invention can be a polyether surface-active agent obtained by alkoxylating organic compounds with reactive hydrogen atoms bonded via oxygen atoms or nitrogen atoms as in for example a fatty alcohol, a fatty acid or a fatty acid amide with 7 to 30 carbon atoms, or an alkylphenol with a total of 4 to 12 carbon atoms in the alkyl. A statistical average of from 3 to 40 alkylene oxide units, preferably 5 to 15 units, per mol, is effective.

Examples of emulsifiers of this type are:
$C_7H_{15}$—O—$(CH_2CH_2O)_4$—$CH_2CH_2OH$,
$C_{14}H_{29}$—O—$(CH_2CH_2O)_5$—$CH_2CH_2OH$
$C_{18}H_{37}$—O—$(CH_2CH_2O)_4$—$CH_2CH_2OH$,
$C_{17}H_{35}$—O—$(CH_2CH_2O)_6$—$CH_2CH_2OH$
$C_{17}H_{35}O$—$(CH_2CH_2O)_{5.5}$—$CH_2CH_2OH$,
$C_{15}H_{31}$—O—$(CH_2CH_2O)_9$—$CH_2CH_2OH$
$C_{14}H_{29}$—O—$(CH_2CH_2O)_{14}$—$CH_2CH_2OH$,
$C_{17}H_{35}$—O—$(CH_2CH_2O)_{19}$—$CH_2CH_2OH$
$C_{20}H_{41}$—O—$(CH_2CH_2O)_{29}$—$CH_2CH_2OH$,
$C_{13}H_{27}COO(CH_2CH_2O)_4$—$CH_2CH_2OH$
$C_{17}H_{35}COO(CH_2CH_2O)_5$—$CH_2CH_2OH$,
$C_{17}H_{33}COO(CH_2CH_2O)_9$—$CH_2CH_2OH$
$C_{15}H_{31}COO(CH_2CH_2O)_{19}$—$CH_2CH_2OH$, $C_{21}H_{43}$—
$COO(CH_2CH_2O)_{19}$—$CH_2CH_2OH$ $C_{13}H_{27}$—
$CO$—$NH(CH_2CH_2O)_2CH_2CH_2OH$,

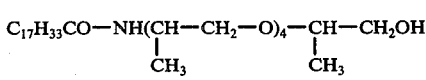

$C_{17}H_{33}CO$—$NH(\underset{CH_3}{CH}$—$CH_2$—$O)_4$—$\underset{CH_3}{CH}$—$CH_2OH$

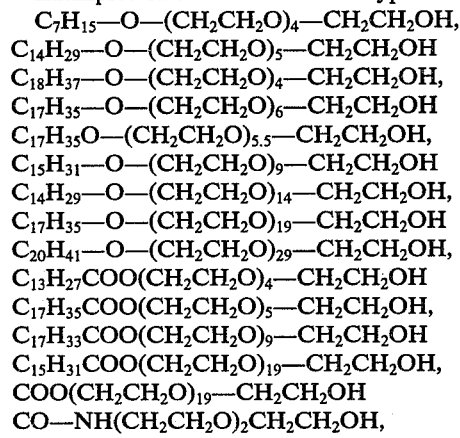

$C_9H_{19}$—⟨phenyl⟩—$O(CH_2CH_2O)_{29}CH_2CH_2OH$, $C_9H_{19}$—⟨phenyl⟩—$O(CH_2CH_2O)_9$—$CH_2CH_2OH$ $C_9H_{19}$—⟨phenyl⟩—$O(CH_2CH_2$—$O)_{14}$—$CH_2CH_2OH$, $C_{12}H_{25}$—⟨phenyl⟩—$O(CH_2CH_2O)_{19}$—$CH_2CH_2OH$ $CH_3$—$\underset{CH_3}{\overset{CH_3}{C}}$—⟨phenyl⟩—$O(CH_2CH_2O)_9$—$CH_2CH_2OH$, -continued

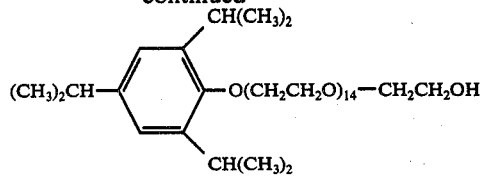

As noted, the polyethoxy chain of emulsifiers can have a methyl branch, and even an ethyl branch though this is less desirable. Stearyl alcohol, oleyl alcohol, coconut oil alcohol tallow fat alcohol or sperm oil alcohol are particularly preferred materials for alkoxylation. Reaction products of stearyl alcohol with, on a statistical average, 5 to 7 mols of ethylene oxide are particularly favourable for use as the emulsifier.

According to the present invention mineral oils which are suitable for the use according to the present invention are water-insoluble unsaponifiable oily substances, such as are present, for example, in refined petroleum and its distillation products, in the distillation products of mineral wax, coal tar and lignite tar as well as of the carbonisation of wood and peat. Mineral oils include, for example, benzine, kerosene, gas oil, lubricating oil and the like. Mineral oils which are obtained by distillation of petroleum (see Ullmanns Enzyklopadie der technischen Chemie (Ullmann's Encyclopedia of Industrial Chemistry), 3rd edition, volume 6, page 548) are preferred for the use according to the present invention and preferably boil in the range from about 180° to about 280° C.

Also preferred are those dust-free or low-dusting powders, according to the present invention, in which the sum of the oil and the polyethoxy emulsifier is about 0.1 to about 2% by weight of the dyestuff formulation. The weight ratio of these two components is preferably between about 20:80 and about 10:90.

The dust-free or low-dusting pulverulent dyestuff formulations according to the present invention are manufactured by adding successively or together in the required proportions
 a. the polyethoxy emulsifier, and
 b. the mineral oil
to a dyestuff, a dyestuff mixture or a dyestuff formulation, and, if necessary, subsequently drying and grinding the resulting mixture.

The dyestuff mixtures or dyestuff formulations to which the dust-resisting ingredients are added can be solid or can be present as a solution or dispersion in water or other volatile liquids.

It is preferred that the foregoing components (a) and (b) be added to a liquid preparation of the dyestuff, for example, solutions in water in the case of water-soluble dyestuffs or dyestuff formulations, or dispersions in water in the case of water-insoluble dyestuffs or dyestuff preparations. Drying of the resulting liquid preparations can be carried out by spray-drying or by drying in a drum drier or paddle drier. This technique yields particularly permanent dust-removing effects.

However, it is also possible without difficulty to add components (a) and (b) to the dry dyestuff or a dry dyestuff formulation. This can be carried out, for example, by grinding the dry substance with the foregoing components in a ball mill or in another suitable mixing unit. The addition of components (a) and (b) is more readily carried out by first incorporating the emulsifier (component (a) and then the mineral oil (component (b) into the dyestuff formulation.

Components (a) and (b) can first be mixed to give a homogeneous anti-dusting formulation as by stirring these two components together at temperatures between 20° and 60° C or kneading them together on screw kneaders or kneading mills. These finished anti-dusting formulations can then be added particularly simply and advantageously to the dyestuffs or dyestuff formulations, preferably to the liquid dyestuff formulations that are to be made resistant to dusting.

The dust-free or low-dusting pulverulent dyestuff formulations according to the present invention are outstandingly suitable for the manufacture of dye liquors or printing pastes. Dye liquors of this type are very widely employed, in particular in the textile dyeing industry. The printing pastes are employed, depending on the nature of the dyestuff, for textile printing or for book-printing and poster-printing.

The dust-free or low-dusting pulverulent dyestuff formulations according to the present invention exhibit exceptionally low dust values which persist over long periods of time. They are excellently free-flowing, do not tend to form lumps or to smear, not even when they come into contact with water or solvents during the manufacture of dye liquors or printing pastes and are very easily wettable with water. Thus they can be standardised, compounded and processed with particular advantage, since the nuisance, losses and environmental problems due to dusting are greatly suppressed.

EXAMPLE 1

15 g of an adduct of an average of 5.5 mols of ethylene oxide and one mol of stearyl alcohol, and 85 g of a mineral oil with a boiling range of 180° to 280° C, are mixed with each other, whilst warming slightly, until a homogeneous mixture is formed. 0.66 g of this mixture is diluted with 6.6 g of water. The resulting milky emulsion is added at 20° to 30° C whilst stirring, to a liquid dyestuff formulation which has the following composition: 130 g of water, 88 g of the azo dyestuff C.I. Disperse Red 184, 88 g of a ligninsulphonate dispersing agent and 88 g of a dispersing agent formed by condensing m-cresol, formaldehyde and sodium sulphite.

The mixture so formed is stirred for a further few minutes until the formulation is homogeneously dispersed, and the resulting liquid dyestuff formulation is then dried by spraying at 175°/185° C. This gives 270 g of a free-flowing dyestuff powder with a dust value of 8 measured after 30 days and 10 measured after 360 days.

A product with similarly favourable dust values is obtained if the above water is omitted when making the above formulation and more intensive and longer subsequent stirring is conducted to achieve a substantially homogeneous dispersion.

EXAMPLE 2

An anti-dusting formulation is manufactured by mixing 25 g of an adduct of an average of 5.7 mols of ethylene oxide and one mol of stearyl alcohol with 75 g of a mineral oil having a boiling range of 180° to 280° C. Mixing of the components is carried out by stirring and their homogenisation can be accelerated by warming slightly, 2 g of this formulation are diluted with 20 g of water and the milky emulsion formed is added to a grinding batch which has the following composition:

200 g of water, 66 g of the azo dyestuff C.I. Disperse Violet 48, 94 g of the dispersing agent formed by neutralizing a condensation product of m-cresol, formaldehyde and sodium sulphite, and 40 g of a desulphonated ligninsulphonate dispersing agent.

The resulting liquid dyestuff formulation is then dried by spraying at 165°/175° C. This gives 200 g of a free-flowing dyestuff powder with a dust value of 2 measured after 30 days and 2 measured after 360 days.

EXAMPLE 3

An emulsion of 18 g of the anti-dusting concentrate used in Example 1 in 180 g of water is added to a sample of 2,950 g of a production batch of a water solution of the soluble sulphur dyestuff Solubilised Sulphur Black 1, C.I. No. 53,186 having a dry solids content of 1,200 g, and the mixture is further stirred until completely homogenised. The resulting dyestuff solution is then dried in a paddle drier at 25 mm Hg and 42° to 80° C. This gives about 1,200 g of a free-flowing dyestuff powder with a dust value of 3 measured after 180 days.

EXAMPLE 4

An anti-dusting concentrate is manufactured by stirring 5 g of an adduct of an average of 5.6 mols of ethylene oxide and one mole of stearyl alcohol with 95 g of a mineral oil having a boiling range of 180° to 280° C. 1.4 g of this anti-dusting formulation are diluted with 14 g of water. The milky emulsion which forms is added at 20°0 to 30° C, whilst stirring, to a dyestuff formulation which has been ground until it can be filtered without leaving a residue and which has the following composition:

200 g of water, 80 g of the azo dyestuff Disperse Yellow 114, 60 g of a dispersing agent formed by condensing m-cresol, nonylphenol, formaldehyde and sodium sulphite, and 60 g of a desulphonated ligninsulphonate dispersing agent.

After uniformly dispersing the resulting mixture, it is dried by spraying at 175°/185° C. This gives 200 g of a free-flowing dyestuff powder with a dust value of 10 measured after 30 days and 10 measured after 360 days.

A similar product is obtained if 5 g of an adduct of 5.6 mols of ethylene oxide and one mol of tallow fat alcohol is substituted for the stearyl alcohol adduct used in this example.

EXAMPLE 5

An aqueous emulsion of 1.5 g of the anti-dusting concentrate of Example 1 and 15 g of water are added to 614 g of an aqueous solution of the dyestuff of the formula

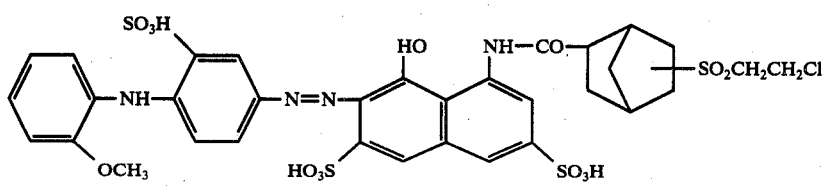

having a dry content of 150 g of dyestuff. The resulting dyestuff solution is then dried by spraying at 185°/195° C. This gives 150 g of a free-flowing dyestuff powder with a dust value of 3 measured after 180 days.

A similarly good product is obtained when 1.5 g of the anti-dusting concentrate is added undiluted to the original dyestuff solution.

If first 0.225 g of an adduct of an average of 5.5 mols of ethylene oxide and one mol of stearyl alcohol, and then 1.275 g of a mineral oil with a boiling range of 180° to 280° C, is added to the original dyestuff solution, whilst stirring with a high-speed stirrer, and stirring is continued until the mineral oil is homogeneously dispersed following which the mixture is then dried by spraying, a free-flowing dyestuff powder with a very low dust value is likewise obtained.

EXAMPLE 6

An anti-dusting concentrate is manufactured by stirring 20 g of an adduct of an average of 5.7 mols of ethylene oxide and one mol of stearyl alcohol, into 80 g of a mineral oil with a boiling range of 180° to 280° C, at 40° C. 2.85 g of this concentrate are diluted with 28.5 g of water. The resulting emulsion is added at 20° to 30°, whilst stirring to a grinding batch which can be filtered without leaving a residue and has the following composition: 210 g of water, 95 g of the vat dyestuff Vat Red 1, C.I. No. 73,360 and 95 g of a ligninsulphonate dispersing agent. The resulting batch is further stirred for a few minutes until it is homogeneously dispersed, and it is then dried by spraying at 165°/175° C. This gives 190 g of a free-flowing dyestuff powder with a dust value of 8 measured after 30 days and 11 measured after 180 days.

A similar good formulation is obtained if the concentrate is added undiluted to the dyestuff formulation.

EXAMPLE 7

A mixture of 1.2 g of the anti-dusting concentrate of Example 1 and 12 g of water is added to a liquid dyestuff formulation consisting of 200 g of water, 77 g of the sulphur vat dyestuff Vat Blue 43, C.I. No. 53,630 and 123 g of a ligninsulphonate dispersing agent, and the resulting mixture is further stirred until the anti-dusting concentrate is homogeneously dispersed. The thus-modified dyestuff formulation is then dried by spraying at 175°/185° C. This gives 200 g of a free-flowing dyestuff powder with a dust value of 9 measured after 30 days and 10 measured after 180 days.

EXAMPLE 8

120 g of the product produced by the reaction of the tetrakisazo dyestuff Direct Black 22, C.I. No. 35,435 with 2 mols of monochloroacetic acid, are dissolved in 400 g of water, whilst stirring. A mixture of 2.4 g of the anti-dusting concentrate of Example 1 and 24 g of water are added to the resulting solution. The mixture is further stirred for a few more minutes until the concentrate is uniformly dispersed in the dyestuff solution and the mixture is then dried by spraying at 175°/185° C. This gives 120 g of a free-flowing dyestuff powder with a dust value of 10 measured after 30 days and 10 measured after 180 days.

A similar product is obtained if in the anti-dusting agent of example 1 the same amount of an adduct of 5.5 mols of ethylene oxide and one mol of oleyl alcohol is substituted for the stearyl alcohol adduct.

EXAMPLE 9

25 g of an adduct of an average of 5.8 mols of ethylene oxide and one mol of stearyl alcohol, and 75 g of a mineral oil with a boiling range of 180° to 280° C, are mixed whilst stirring at 50° to 60° to give a homogeneous mixture. 1.6 g of this mixture are diluted with 16 g of water and the resulting emulsion is added at 20° to 30° C with stirring to a liquid grinding batch which can be filtered without leaving a residue and has the following composition: 200 g of water, 82 g of the sulphur dyestuff Sulphur Black 11, C.I. No. 53,290 and 118 g of a ligninsulphonate dispersing agent. The dyestuff dispersion is then dried by spraying at 175°/185° C. This gives 200 g of a free-flowing dyestuff powder with a dust value of 1 measured after 180 days.

Almost the same effect is obtained if 25 g of an adduct of 5.8 mols of ethylene oxide and one mol of sperm oil alcohol is substituted for the stearyl alcohol adduct used in this example.

EXAMPLE 10

A reaction batch consisting of water, the blue sulphur dyestuff Vat Blue 43, C.I. No. 53,630, a molasses dispersing agent and a dispersing agent which is a condensation of naphthalenesulphonic acid, formaldehyde, sodium chloride and sodium sulphide, is stirred at about 50° C until the sulphur dyestuff is completely dissolved. 5 g of the anti-dusting concentrate of Example 1 are added to a 1,000 g sample of this reaction batch with a content of 120 g of the sulphur dyestuff and a total of 300 g of dry solids. The mixture is stirred for a few minutes until the concentrate is completely uniformly dispersed and the resulting solution is then dried in a drum drier. 300 g of a free-flowing dyestuff powder with a dust value of 9 measured after 30 days and 11 measured after 180 days are obtained.

An equally good result is obtained if the concentrate is diluted with 5 times to 10 times of its volume water before being added to the dyestuff solution.

EXAMPLE 11

A mixture of 1.05 g of the anti-dusting concentrate of Example 1 and 10 g of water is added to a dyestuff formulation which can be filtered without leaving a residue and consists of 295 g of water, 50 g of the yellow vat dyestuff Vat Yellow 37, 50 g of a ligninsulphonate dispersing agent and 5 g of sodium polyphosphate. The resulting mixture is further stirred for a few minutes until the concentrate is homogeneously dispersed and it is then dried by spraying at 175°/185° C.

This gives 105 g of a free-flowing dyestuff powder with a dust value of 11 measured after 30 days and 11 measured after 180 days.

What is claimed is:

1. In a dyestuff formulation having added material dispersed in it to impart dusting resistance to the formulation when powdered, the improvement according to which the added material is a mixture of a mineral oil boiling in the range of from about 140° to about 310° C, and emulsifier having a polyethoxy hydrophile in an amount sufficient to disperse the oil.

2. The combination of claim 1 in which the mixture is from about 0.05 to about 3% by weight of the formulation solids, and the weight ratio of emulsifier to oil is from about 35:65 to about 5:95.

3. The combination of claim 1 in which the emulsifier is a polyethoxylated fatty alcohol, fatty acid, fatty acid amide or alkylphenol, the fatty chain of the fatty alcohol, fatty acid and fatty acid amide having 7 to 30 carbons, and the alkyl of the alkylphenol having 4 to 12 carbons.

4. The combination of claim 3 in which the emulsifier is a polyethoxylated stearyl alcohol, oleyl alcohol or coconut oil alcohol.

5. The combination of claim 1 in which the polyethoxy chain has 5 to 15 ethylene oxide units per mol.

6. The combination of claim 1 in which the emulsifier is the reaction product of stearyl alcohol with, on a statistical average, 5 to 7 mols of ethylene oxide.

7. The combination of claim 1 in which the mineral oil is essentially a refined petroleum fraction.

8. The combination of claim 1 in which the mineral oil boils in the range of from about 180° to about 280° C.

9. The combination of claim 1 in which the dyestuff is an azo, anthraquinone, methine, quinophthalone, indigo or thioindigo dyestuff.

10. A mixture of about 65 to about 95% by weight mineral oil boiling in the range of about 140° to about 310° C, with about 5 to about 35% by weight of an emulsifier having a polyethoxy hydrophile.

* * * * *